US010464507B2

(12) United States Patent
Yang et al.

(10) Patent No.: US 10,464,507 B2
(45) Date of Patent: Nov. 5, 2019

(54) BATTERY MANAGEMENT SYSTEM AND SWITCHING METHOD THEREOF

(71) Applicant: Samsung SDI Co., Ltd., Yongin-si, Gyeonggi-do (KR)

(72) Inventors: Hakcheol Yang, Yongin-si (KR); Eunra Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1495 days.

(21) Appl. No.: 13/917,563

(22) Filed: Jun. 13, 2013

(65) Prior Publication Data
US 2014/0252847 A1 Sep. 11, 2014

Related U.S. Application Data

(60) Provisional application No. 61/774,374, filed on Mar. 7, 2013.

(51) Int. Cl.
*B60R 16/03* (2006.01)
*B63H 21/00* (2006.01)
(Continued)

(52) U.S. Cl.
CPC .......... *B60R 16/03* (2013.01); *B60L 3/0046* (2013.01); *B60L 3/04* (2013.01); *B60L 50/51* (2019.02);
(Continued)

(58) Field of Classification Search
CPC .................. B60R 16/03; B60H 21/00
(Continued)

(56) References Cited

U.S. PATENT DOCUMENTS 7,368,829 B2 * 5/2008 Tezuka ................. H01H 47/002
307/9.1
7,468,565 B2 * 12/2008 Hoshiba ................. B60L 3/003
307/10.1
(Continued)

FOREIGN PATENT DOCUMENTS

CN 102673415 A 9/2012
EP 2 415 628 A2 2/2012
(Continued)

OTHER PUBLICATIONS

Machine English Translation of JP2011-166950A, Patent Abstracts of Japan, 25 pages.
(Continued)

*Primary Examiner* — Daniel Kessie
(74) *Attorney, Agent, or Firm* — Lewis Roca Rothgerber Christie LLP

(57) ABSTRACT

An embodiment of the present invention provides a battery management system and a switching method thereof, which can prevent fusion of a relay by preventing arcing and voltage spikes when the relay is turned off (opened). To this end, the embodiment of the present invention provides a battery management system including one or more battery packs; a master battery management unit sensing voltages and/or currents of the battery packs; main relays connected between the battery packs and loads and turned on or off by the master battery management unit; and sub relays connected to the main relays in parallel, turned on or off by the master battery management unit and having resistors, wherein when switching occurs in which the main relays are turned off, the sub relays are first turned on and the main relays are then turned off.

19 Claims, 12 Drawing Sheets

(51) Int. Cl.
  *B60L 3/00* (2019.01)
  *B60L 3/04* (2006.01)
  *H02H 9/00* (2006.01)
  *H02J 7/00* (2006.01)
  *B60L 50/51* (2019.01)
  *B60L 58/21* (2019.01)

(52) U.S. Cl.
  CPC .............. *B60L 58/21* (2019.02); *B63H 21/00* (2013.01); *H02H 9/001* (2013.01); *H02J 7/0026* (2013.01); *H02J 7/0029* (2013.01); *Y02T 10/7011* (2013.01); *Y02T 10/7055* (2013.01); *Y02T 10/7061* (2013.01); *Y10T 307/76* (2015.04)

(58) Field of Classification Search
  USPC .................................................. 307/9.1, 10.1
  See application file for complete search history.

(56) References Cited

U.S. PATENT DOCUMENTS

| | | | | |
|---|---|---|---|---|
| 7,573,150 | B2* | 8/2009 | Hirasawa | B60L 3/0046 307/132 EA |
| 8,264,201 | B2* | 9/2012 | Tae | H02J 7/0014 320/118 |
| 8,513,953 | B2* | 8/2013 | Myoen | H02H 9/001 180/443 |
| 2004/0061503 | A1* | 4/2004 | Morimoto | B60K 6/28 324/418 |
| 2006/0224360 | A1* | 10/2006 | Kishimoto | B60L 3/0023 702/183 |
| 2008/0129249 | A1* | 6/2008 | Ishishita | G01R 35/00 320/136 |
| 2010/0123989 | A1 | 5/2010 | Kosaki et al. | |
| 2010/0127663 | A1 | 5/2010 | Furukawa et al. | |
| 2011/0111268 | A1* | 5/2011 | Weng | H01M 10/441 429/50 |
| 2012/0082876 | A1* | 4/2012 | Yamamoto | H01M 2/10 429/90 |
| 2012/0229057 | A1* | 9/2012 | Ogawa | B60L 11/1803 318/139 |
| 2012/0313439 | A1* | 12/2012 | Yamaguchi | H01M 10/425 307/71 |
| 2013/0264995 | A1* | 10/2013 | Lee | B60L 11/1803 320/104 |
| 2014/0125290 | A1* | 5/2014 | Kim | H02J 7/0065 320/135 |

FOREIGN PATENT DOCUMENTS

| | | |
|---|---|---|
| JP | 2003-204606 A | 7/2003 |
| JP | 2006-333693 | 12/2006 |
| JP | 2007-118797 A | 5/2007 |
| JP | 2007-200817 | 8/2007 |
| JP | 2007-282359 | 10/2007 |
| JP | 2007-118797 A5 | 2/2008 |
| JP | 2010-193558 | 9/2010 |
| JP | 2011-166950 A | 8/2011 |
| KR | 10-2005-0045597 | 5/2005 |
| KR | 10-2008-0037941 A | 5/2008 |
| KR | 10-2010-0062702 | 6/2010 |
| KR | 10-2010-0089518 A | 8/2010 |
| WO | WO 2012/173408 A2 | 12/2012 |

OTHER PUBLICATIONS

Chinese Office Action with machine English translation for Patent Application No. 201310356574.8, dated Mar. 23, 2017, 26 pages.
EPO Search Report dated Aug. 26, 2015, for corresponding European Patent application 13175618.1, (7 pages).
Espacenet English Abstract and English machine translation of Japanese Publication 2006-333693 dated Dec. 7, 2006, (22 pages).
Espacenet English Abstract and English machine translation of Japanese Publication 2007-200817 dated Aug. 9, 2007, (14 pages).
Espacenet English Abstract and English machine translation of Japanese Publication 2007-282359 dated Oct. 25, 2007, (17 pages).
Espacenet English Abstract and English machine translation of Japanese Publication 2010-193558 dated Sep. 2, 2010, (25 pages).
JPO Office Action dated May 30, 2017, for corresponding Japanese Patent Application No. 2013-220312 (3 pages).
EPO Office Action dated Oct. 8, 2018, for corresponding European Patent Application No. 13175618.1 (5 pages).

\* cited by examiner

BATTERY MANAGEMENT SYSTEM AND SWITCHING METHOD THEREOF

CROSS-REFERENCE TO RELATED APPLICATION

This application claims priority to and the benefit of U.S. Provisional Application No. 61/774,374, filed on Mar. 7, 2013 in the U.S. Patent and Trademark Office, the entire content of which is incorporated herein by reference.

BACKGROUND

1. Field

Aspects of embodiments relate to a battery management system and a switching method thereof.

2. Description of the Related Art

Vehicles using the internal combustion engine using gasoline or diesel oil as vehicle fuel release harmful exhaust gases considered to be one of the primary causes of air pollution. Accordingly, in recent years, in order to decrease environmental pollution, efforts to develop electric vehicles and hybrid vehicles have been actively pursued.

An electric vehicle has an electric motor that is powered by a battery pack including a plurality of rechargeable secondary battery cells. Since an electric vehicle uses a battery pack as a main power source, exhaust gas is not generated and little noise is produced. A hybrid vehicle combines elements of an internal combustion engine vehicle and of an electric vehicle, using, for example, both an internal combustion engine and a battery-powered motor.

In a vehicle using electrical energy, battery performance directly affects the performance of the vehicle. Thus, each battery cell should have excellent performance, and there is a need for a battery management system capable of efficiently managing charge and discharge of each battery cell by measuring the voltages of individual battery cells, and the voltage, current and temperature of the entire battery pack.

The battery management system may include a plurality of relays for supplying power from a battery to a motor, supplying power from a generator to a battery, or blocking a power supply in an emergency. A relay may be subjected to severe stress if it is turned off (opened) while current is flowing through it; in particular, it may be melted as arcing and voltage spikes occur in the relay.

SUMMARY

Aspects of embodiments of the present invention are directed toward a battery management system and a switching method thereof, which can prevent fusion of a relay by preventing arcing and the occurrence of voltage spikes when the relay is turned off.

According to an embodiment of the present invention there is provided a battery management system including: a first main relay connected between a battery pack and a load; a first sub relay element including a first sub relay, the first sub relay element connected between the battery pack and the load in parallel with the first main relay; and a controller configured to control the first main relay and the first sub relay; the controller configured with the first main relay and the first sub relay element, when the battery pack is to be electrically disconnected from the load, to turn the first main relay off only when the first sub relay is turned on.

In one embodiment, the first sub relay element further includes a resistor connected between the battery pack and the load in series with the first sub relay.

In one embodiment, the controller is configured to turn on the first sub relay before turning off the first main relay.

In one embodiment, the controller is configured to turn off the first sub relay after turning off the first main relay.

In one embodiment, the system includes a second main relay connected between the second electrode and the load.

In one embodiment, the controller is further configured to control the second main relay, and the controller is configured with the first main relay, the first sub relay element, and the second main relay, to turn the second main relay off only when the first sub relay is turned on and the first main relay is turned off.

In one embodiment, the system includes a second sub relay element including a second sub relay, the second sub relay element connected between the battery pack and the load in parallel with the second main relay.

In one embodiment, the second sub relay element further includes a resistor connected between the battery pack and the load in series with the second sub relay.

In one embodiment, the controller is further configured to control the second main relay and the second sub relay; the controller configured with the second main relay and the second sub relay element to turn the second main relay off only when the second sub relay is turned on.

In one embodiment, the load includes an inverter.

In one embodiment, the load includes a motor generator coupled to the inverter.

In one embodiment, the controller includes an inverter controller configured to control the inverter, a master battery management system configured to monitor an operating condition of the battery pack, and/or an air bag controller.

In one embodiment, the battery pack includes a positive electrode and a negative electrode, and the first main relay is connected between the positive electrode and the load and the first sub relay is connected between the positive electrode and the load.

In one embodiment, the battery pack includes a positive electrode and a negative electrode, and the first main relay is connected between the negative electrode and the load and the first sub relay is connected between the negative electrode and the load.

In one embodiment, the system includes a second main relay connected between the negative electrode and the load.

In one embodiment, the system includes a second main relay connected between the positive electrode and the load.

According to an embodiment of the present invention there is provided a method for switching, in a battery management system, the method including: turning on a first main relay connected between a battery pack and a load; turning on a first sub relay in a first sub relay element, the first sub relay element connected between the battery pack and the load in parallel with the first main relay; and turning off the first main relay before turning off the first sub relay.

In one embodiment, the method includes: turning on a second main relay connected between the battery pack and the load; and turning off the second main relay after turning off the first main relay and before turning off the first sub relay.

In one embodiment, the method includes turning on a second main relay connected between the battery pack and the load; and turning on a second sub relay in a second sub relay element, the second sub relay element connected between the battery pack and the load in parallel with the second main relay; and turning off the second main relay before turning off the second sub relay.

In one embodiment, the load includes an inverter, and the turning off of the first main relay before the turning off of the first sub relay includes turning off the first main relay in accordance with a signal from an inverter controller configured to control the inverter or from an air bag controller configured to control an air bag before turning off the first sub relay in accordance with a signal from the inverter controller or from the air bag controller.

Embodiments of the present invention provide a battery management system and a driving method thereof, which can prevent fusion of a relay by preventing arcing and spiking when the relay is turned off.

In addition, according to an embodiment of the present invention, before the main relay is turned off, the sub relay having a resistor is first turned on (closed), the main relay is then turned off and the sub relay is finally turned off, so that the current of the main relay decreases step by step, thereby preventing arcing and spiking from occurring to the main relay. Accordingly, it is possible to prevent the main relay from being fused.

DETAILED DESCRIPTION

Figure 1:
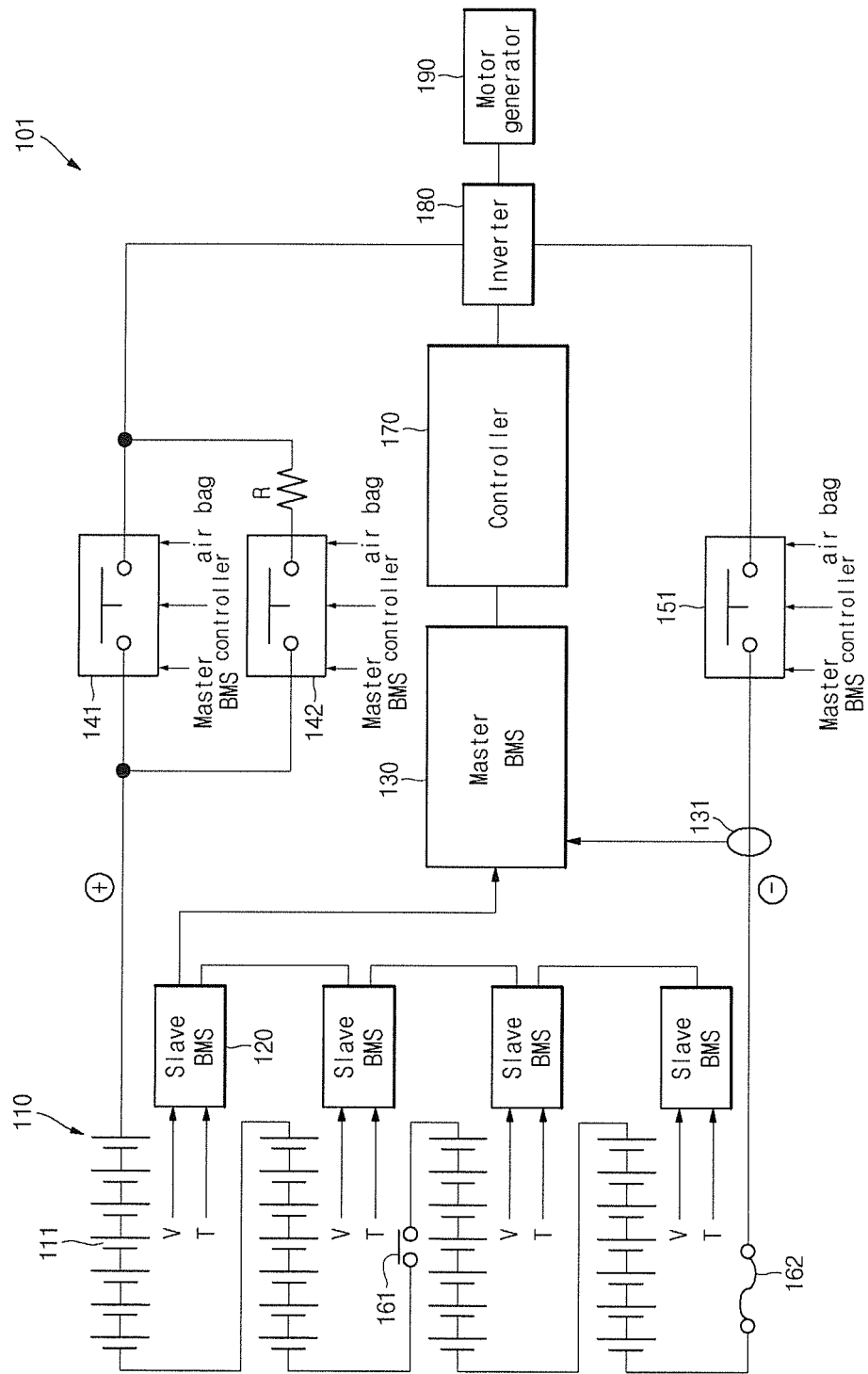
FIG. 1 is a block diagram illustrating a configuration of a battery management system according to an embodiment of the present invention.

Hereinafter, examples of embodiments of the invention are described in more detail with reference to the accompanying drawings such that they can easily be made and used by those skilled in the art.

Example embodiments are described more fully hereinafter with reference to the accompanying drawings; however, they may be embodied in different forms and should not be construed as limited to the embodiments set forth herein. Rather, these embodiments are provided so that this disclosure should be thorough, and should fully convey the scope of the disclosure to those skilled in the art.

In addition, in the drawing figures, the dimensions of layers and regions may be exaggerated for clarity of illustration. In the drawing figures, like reference numerals refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present invention.

In addition, as used herein, the term "relay" is used to include an electromagnetic relay, for example, a DC electromagnetic relay, an AC electromagnetic relay, a magnetic latching relay, a polarized relay, a reed relay, or the like. Further, as used herein, the term "relay" is used to include a device capable of controlling a relatively large electric signal using a relatively small electric signal, but the present invention does not limit the kind of relay to those listed herein.

FIG. 1 is a block diagram illustrating a configuration of a battery management system according to an embodiment of the present invention.

As illustrated in FIG. 1, a battery management system 101 according to the present invention includes a plurality of battery packs 110, a plurality of slave battery management units 120, a master battery management unit 130, a current sensor 131, a first main relay 141, a first sub relay 142 and a second main relay 151. In addition, the battery management system 101 according to the present invention may further include a safety switch 161 and a safety fuse 162. Moreover, the battery management system 101 according to the present invention may further include a controller 170, an inverter 180 and a motor generator 190.

Each of the plurality of battery packs 110 may include a plurality of battery cells 111. The battery cells 111 may be connected to each other in series and/or in parallel. In addition, the plurality of battery packs 110 may also be connected to each other in series and/or in parallel. Each of the battery cells 111 may be a lithium ion battery, a lithium polymer battery or an equivalent thereof, but the invention is not limited thereto. In addition to, or instead of, the battery packs 110, fuel cells, solar cells or a wind power generator may also be used in the present invention.

The plurality of slave battery management units 120 are electrically connected to the corresponding battery packs 110, and sense voltages and/or temperatures of the battery packs 110, and manage charging, discharging and/or cell balancing of the battery packs 110. Each slave battery management unit 120 may manage one of the battery packs 110. In addition, the slave battery management units 120 may be electrically connected to each other by a controller area network (CAN) bus, but aspects of the present invention are not limited thereto. For example, the slave battery management units 120 may be electrically connected to each other by a serial communications link, such as RS232, RS422 or IEEE1394.

The master battery management unit 130 is electrically connected to the slave battery management units 120, and manages the overall charging, discharging and/or pack balancing of all of the battery packs 110 based on the voltages and/or temperatures of the battery packs 110, which are transmitted by the respective slave battery management units 120 to the master battery management unit 130. In addition, the master battery management unit 130 manages the battery packs 110, using the signal from the current sensor 131, to prevent over-current from being driven through, or drawn from, the battery packs 110. Further, the master battery management unit 130 directly controls the state of the first main relay 141, the first sub relay 142, the second main relay 151 and the second sub relay 152.

The current sensor 131, which is electrically connected between the battery packs 110 and a load (e.g., the inverter 180), senses the charging current supplied to the battery packs 110 and/or the discharging current drawn from the battery packs 110 and transmits a signal indicating the sensed current to the master battery management unit 130. The current sensor 131 may be a hall sensor, a shunt resistor, or an equivalent thereof, but aspects of the present invention are not limited thereto.

The first main relay 141 is electrically connected between a positive electrode of the plurality of battery packs 110 and the load (e.g., the inverter 180). The first main relay 141 is maintained in a turned-on state when the battery packs 110 are in a normal state. However, when one or more of the battery packs 110 is in an abnormal state, such as in an over-charge, over-discharge and/or over-current state, the first main relay 141 is turned off, e.g., switched off. To this end, the first main relay 141 is turned on and/or off by a control signal from the battery management unit 130. In other embodiments, the first main relay 141 is turned on and/or off by a control signal from the inverter controller 170 controlling the inverter 180 or from an air bag controller controlling an air bag. In practice, the first main relay 141 is primarily turned on and/or off by the inverter controller 170, and is secondarily turned on and/or off by the master battery management unit 130 when the inverter controller 170 is malfunctioning. The first main relay 141 may be turned on and/or off at any time by the control signal from the air bag controller.

The first sub relay 142 includes a resistor R and is connected in parallel with the first main relay 141. The resistor R is connected in series with the first sub relay 142. The first sub relay 142 is maintained in a turned-off state when the battery packs 110 are in a normal state, and it is turned on, e.g., put in a turned-on state, for a set time before the first main relay 141 is turned off. In one embodiment, the first sub relay 142 may first be turned on to provide an initial, preliminary charge to the battery packs 110 when the battery packs 110 have been over-discharged. When the preliminary charging of the battery packs 110 is complete, the first sub relay 142 is turned off, and the first main relay 141 is turned on. Like the above-described first main relay 141, the first sub relay 142 is turned on and/or off by the control signal from the battery management unit 130.

Like the above-described first main relay 141, the first sub relay 142 may also be turned on and/or off by a control signal from the inverter controller 170 controlling the inverter 180 or by a control signal from an air bag controller controlling an air bag. The first sub relay 142 may be primarily turned on and/or off by the inverter controller 170, and may be secondarily turned on and/or off by the master battery management unit 130 when the inverter controller 170 is malfunctioning. The first sub relay 142 may be turned on and/or off at any suitable time by the control signal from the air bag controller.

The second main relay 151 is electrically connected between a negative electrode of the plurality of battery packs 110 and the load (e.g., the inverter 180). The second main relay 151 is maintained in a turned-on state when the battery packs 110 are in a normal state. However, when one or more of the battery packs 110 is in an abnormal state, such as in over-charge, over-discharge and/or over-current state, the second main relay 151 is turned off. To this end, the second main relay 151 is turned on and/or off by the control signal from the battery management unit 130. In other embodiments, the second main relay 151 is turned on and/or off by the control signal from the inverter controller 170 controlling the inverter 180 or from an air bag controller controlling an air bag. In practice, and according to one embodiment, the second main relay 151 is primarily turned on and/or off by the inverter controller 170, and is secondarily turned on and/or off by the master battery management unit 130 when the inverter controller 170 is malfunctioning. The second main relay 151 may be turned on and/or off at any time by the control signal from the air bag controller.

The safety switch 161 is electrically connected between the battery packs 110, and may be turned off by an operator while a battery management system 101 is being repaired or examined, reducing the risk of operator electrocution.

The safety fuse 162 is electrically connected between the battery packs 110 and the load (i.e., the inverter 180), and is fused or melted, interrupting the flow of current, when a current exceeding a maximum allowable current flows through it, thereby protecting the battery management system 101 from damage.

The controller 170 is electrically connected to the master battery management unit 130 and controls the inverter 180 based on information obtained from the master battery management unit 130. Here, information on a driver's accelerator pedal angle and/or brake pedal angle may be input to the controller 170, so that the inverter 180 is controlled by the controller 170. The controller 170 may also be referred to as a motor control unit or a hybrid control unit.

The inverter 180 is electrically connected to the first main relay 141, the first sub relay 142 and the second main relay 151. The inverter 180 converts power supplied from the battery packs 110 into a set or predetermined level of power when a vehicle accelerates, and transmits the converted power to the motor generator 190, or, when the vehicle decelerates, transmits the power obtained from the motor generator 190 to the battery packs 110. That is to say, the inverter 180 operates in two ways.

The motor generator 190 is electrically connected to the inverter 180 to provide a thrust to the vehicle, or to provide power to the battery packs 110 when the vehicle decelerates.

Figure 2:
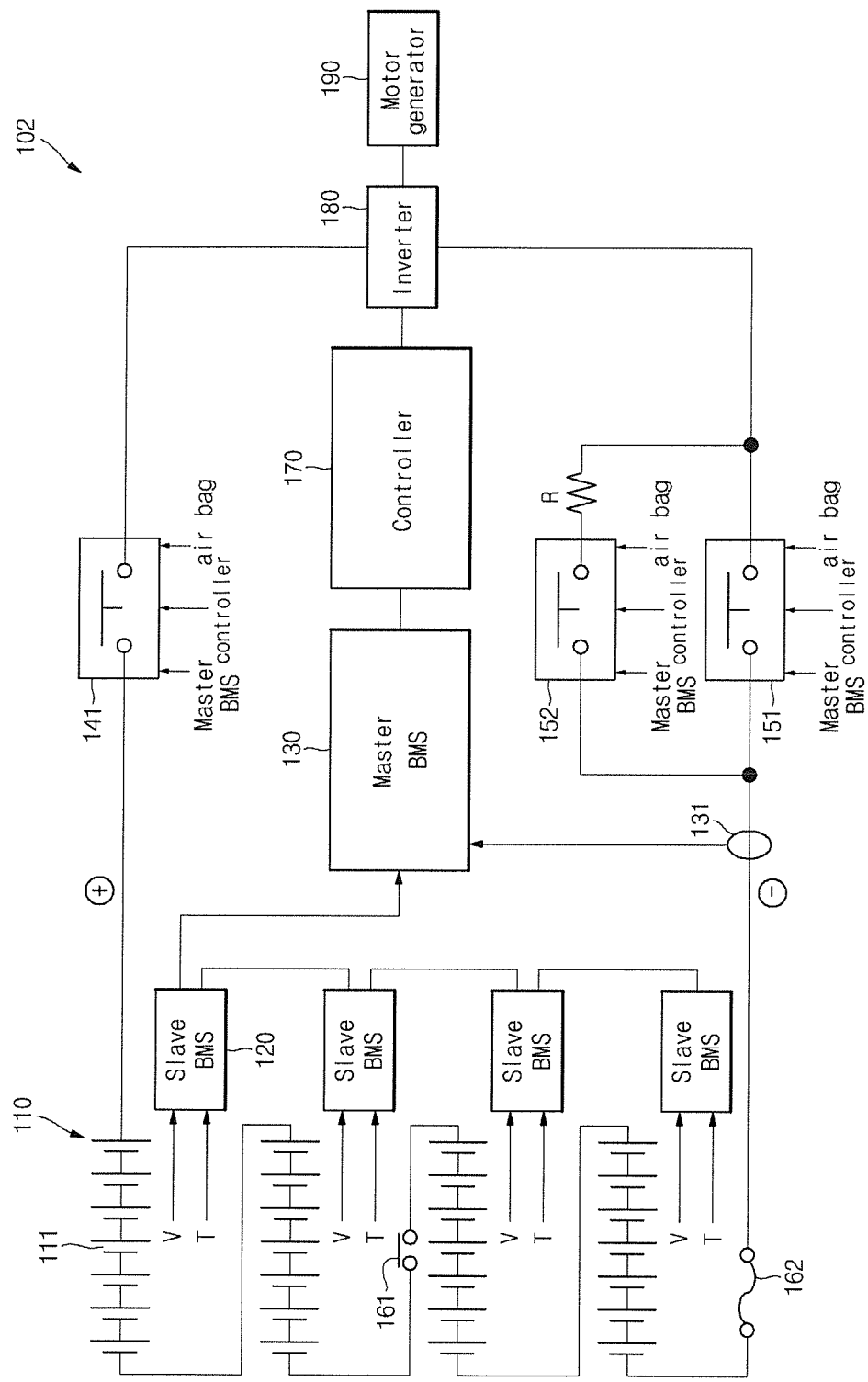
FIG. 2 is a block diagram illustrating a configuration of a battery management system according to another embodiment of the present invention.

FIG. 2 is a block diagram illustrating a configuration of a battery management system according to another embodiment of the present invention. The battery management system 102 shown in FIG. 2 is substantially the same as the battery management system 101 shown in FIG. 1, except for the locations in which the sub relays are installed. That is to say, as illustrated in FIG. 2, in the battery management system 102, second main relay 151 is electrically connected between a negative electrode of the battery packs 110 and the load (e.g., the inverter 180), and the second sub relay 152 is electrically connected in parallel with the second main relay 151. A resistor R is connected in series with the second sub relay 152.

Figure 9:
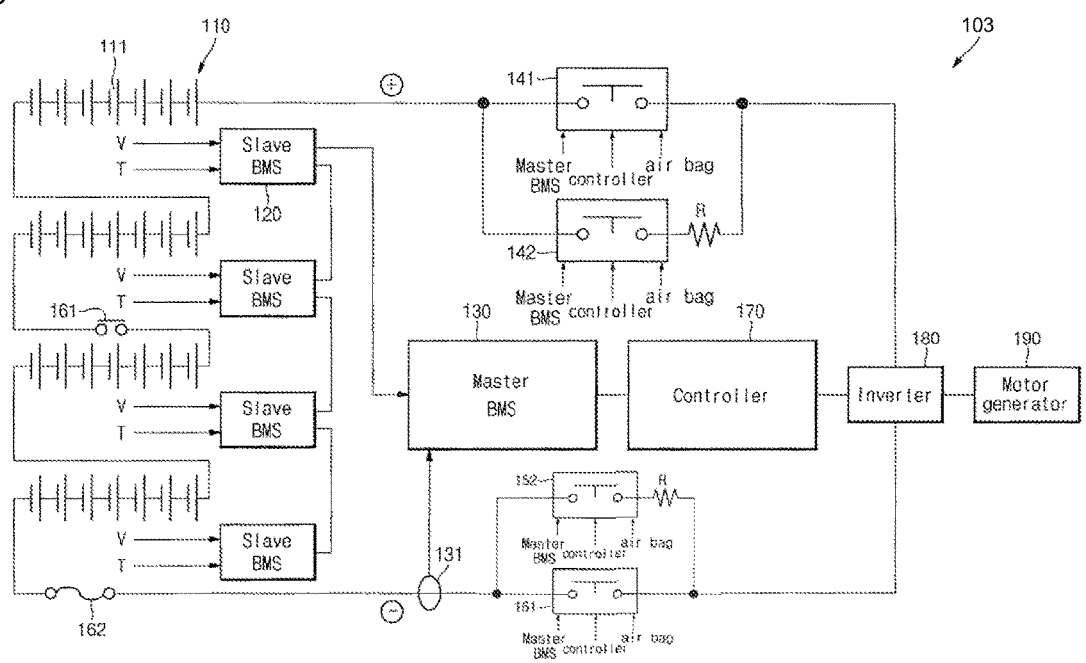
FIG. 9 is a block diagram illustrating a configuration of a battery management system according to another embodiment of the present invention.

FIG. 9 is a block diagram illustrating a configuration of a battery management system according to another embodiment of the present invention. The battery management system 103 shown in FIG. 9 is substantially similar to the battery management systems 101 shown in FIGS. 1 and 102 shown in FIG. 2, except that it includes the first main relay 141, the first sub relay 142, the second main relay 151, and the second sub relay 152 substantially as described above.

Figure 3:
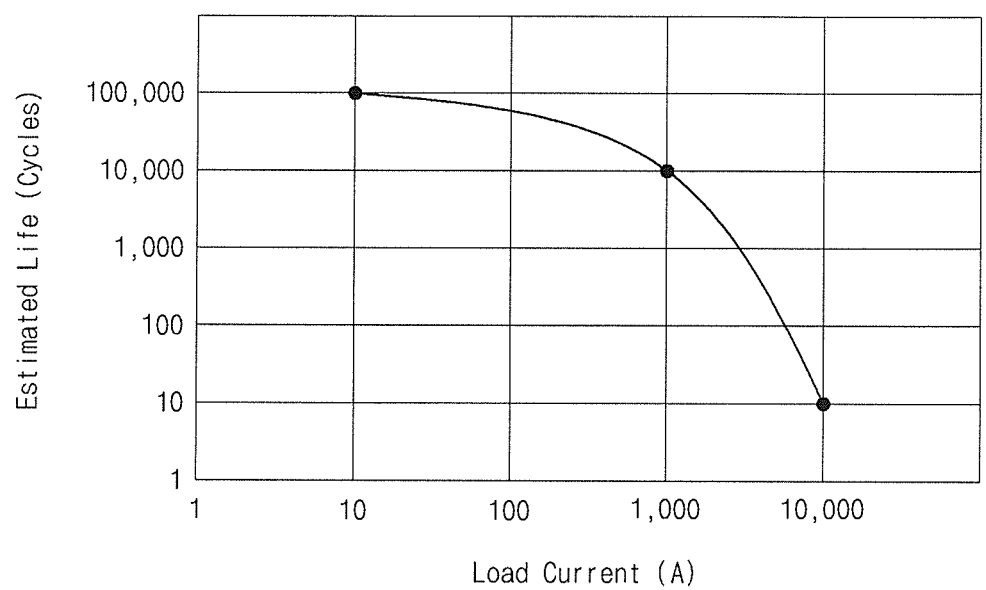
FIG. 3 is a graph illustrating the relationship between the load current and life of a relay according to an embodiment of the present invention.

FIG. 3 is a graph illustrating the relationship between the load current and life of a relay. In FIG. 3, the X axis indicates load current (A), and the Y axis indicates estimated life (in cycles) of a relay. Here, the number of cycles refers to the number of times the relay is turned on and off.

As illustrated in FIG. 3, the higher the load current, the shorter the estimated life, and the lower the load current, the longer the estimated life. Thus, in order to increase the life of a relay, it is necessary to reduce the load current when the relay is turned on and/or off. In particular, compared to a case where the relay is turned on, in a case where the relay is turned off, relatively severe stress is applied to the relay. Therefore, it is necessary to reduce the load current when the relay is turned off.

Figure 4:
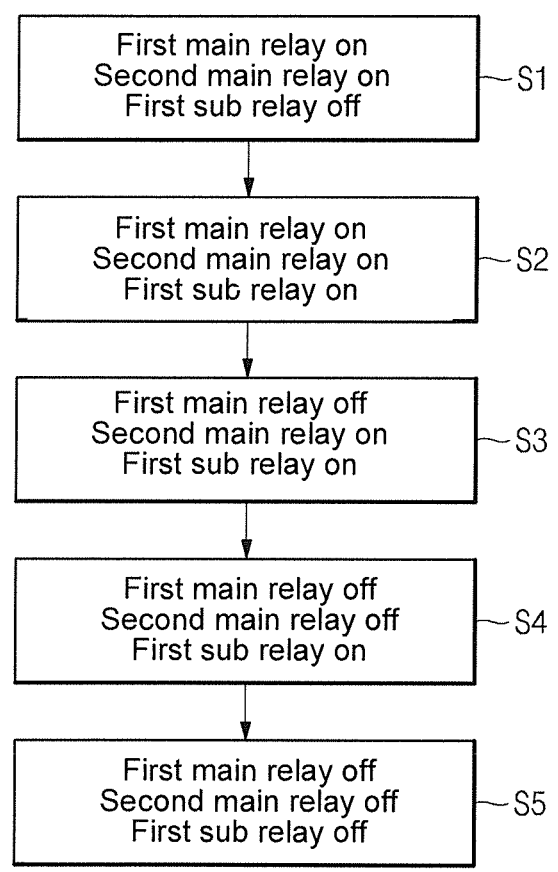
FIG. 4 is a flowchart illustrating a method for switching relays in a battery management system according to an embodiment of the present invention.

FIG. 4 is a flowchart illustrating a method for switching relays in a battery management system according to an embodiment of the present invention.

FIG. 4 illustrates a switching method for the battery management system 101 shown in FIG. 1. The method is a method for switching from a state in which the battery packs 110 and the load (i.e., the inverter 180) are electrically connected to each other to a state in which the battery packs 110 and the load are electrically disconnected from each other.

As illustrated in FIG. 4, the switching method according to the present invention includes turning on first and second main relays (S1), turning on a first sub relay (S2), turning off the first main relay (S3), turning off the second main relay (S4) and turning off the first sub relay (S5).

FIGS. 5a to 5e illustrate sequential states in a method for switching relays in a battery management system according to an embodiment of the present invention. The switching method of the battery management system 101 according to an embodiment of the present invention is described with reference to FIGS. 5a to 5e together with FIG. 4. Here, the controlling is done by the controller 170, the master battery management unit 130 or the air bag controller. In practice, and according to one embodiment, the controller 170 has primary control capacity, and when the controller 170 cannot properly perform a control operation, the master battery management unit 130 has primary control capacity. In addition, as soon as the air bag is activated, the air bag controller has primary control capacity.

Figure 5A:
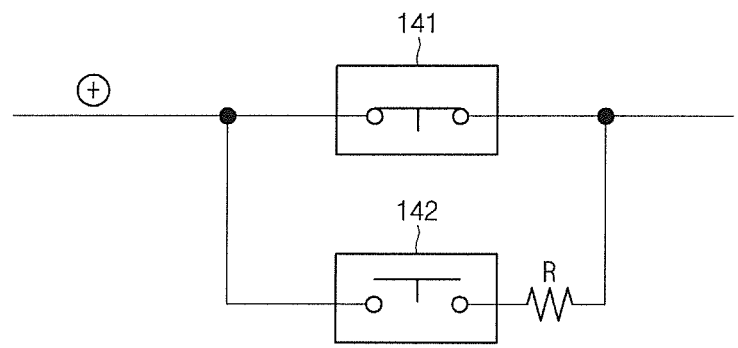
FIGS. 5a to 5e illustrate sequential states in a method for switching relays in a battery management system according to an embodiment of the present invention.
Figure 5A:
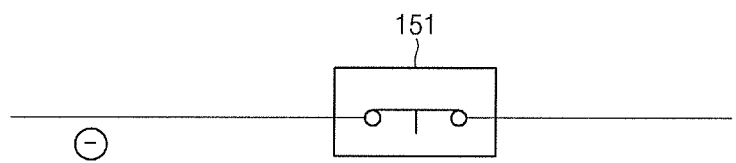

In step S1, as illustrated in FIG. 5a, the first main relay 141 and the second main relay 151 are turned on, thereby electrically connecting the battery packs 110 and the load (e.g., the inverter 180). Here, the first sub relay 142 is maintained in a turned-off state while the battery packs 110 are normally charged and/or discharged.

Figure 5B:
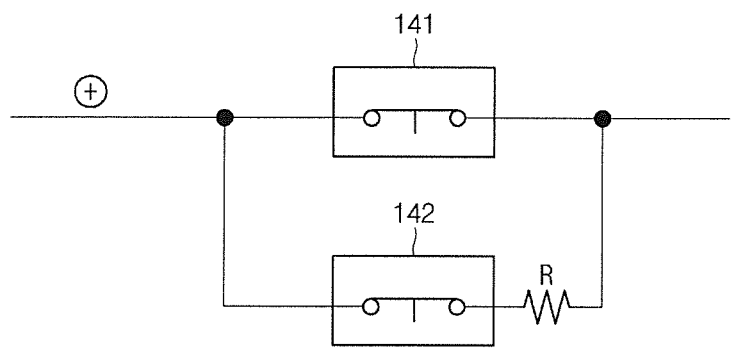
Figure 5B:
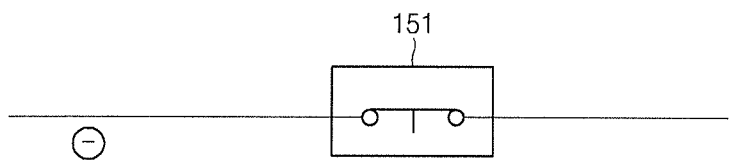

In step S2, as illustrated in FIG. 5b, the first sub relay 142 is turned on, thereby reducing the current flowing through the first main relay 141. That is to say, before the first sub relay 142 is turned on, the current flows through only the first main relay 141. However, as the first sub relay 142 is turned on, the current flowing through the first main relay 141 is reduced. This state is initiated when the battery packs 110 are abnormally charged and/or discharged, when the current exceeds a threshold current, or when the air bag is activated.

Figure 5C:
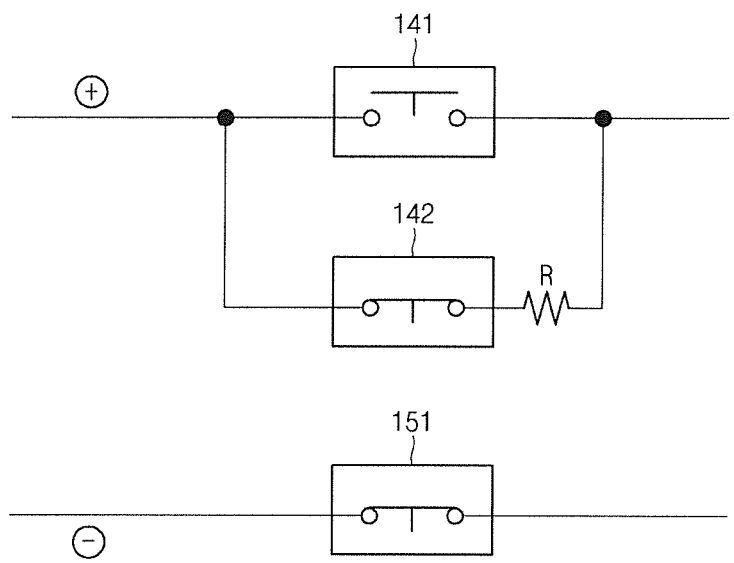

In step S3, as illustrated in FIG. 5c, the first main relay 141, which is connected to the first sub relay 142 in parallel, is turned off. Here, since the first sub relay 142 is turned on, even if the first main relay 141 is turned off, the current between the positive electrode of the battery packs 110 and the load (e.g., the inverter 180) is not sharply reduced. That is to say, even if the first main relay 141 is turned off, a set or certain level of current flows through the first sub relay 142 since the first sub relay 142, having the resistor R, is turned on.

Figure 5D:
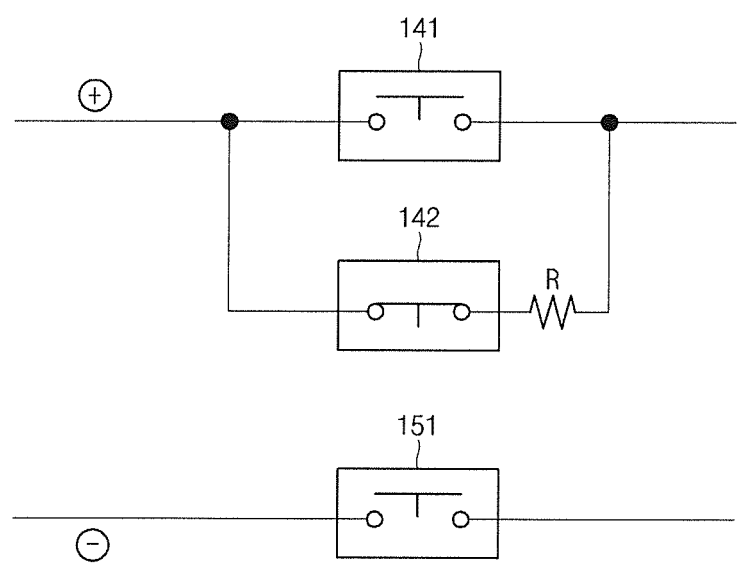

In step S4, as illustrated in FIG. 5d, the second main relay 151 is turned off, thereby blocking an electrical path between the negative electrode of the battery packs 110 and the load (e.g., the inverter 180).

Figure 5E:
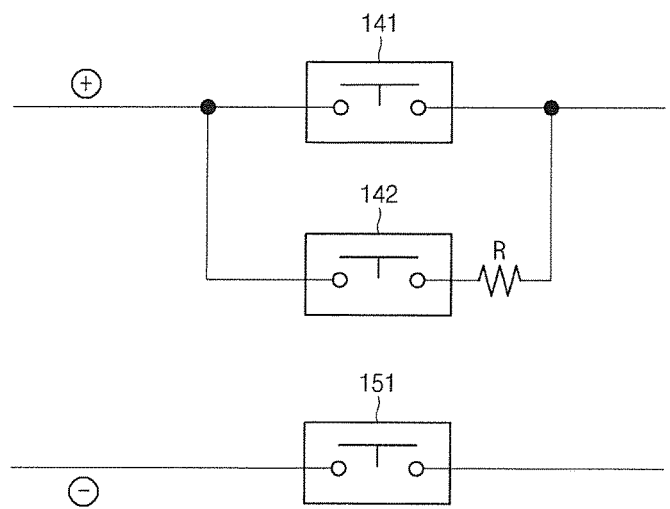

In step S5, as illustrated in FIG. 5e, the first sub relay 142 is turned off, thereby blocking an electrical path between the positive electrode of the battery packs 110 and the load (i.e., the inverter 180). In such a manner, the electrical path between the battery packs 110 and the load (i.e., the inverter 180) is completely blocked.

Therefore, in the battery management system 101 and the switching method thereof according to embodiments of the present invention, when the first main relay 141, which is connected between the positive electrode of the battery packs 110 and the load, is turned off (opened), the current is slowly reduced, thereby preventing arcing and voltage spikes from occurring and ultimately efficiently preventing fusion of the first main relay 141. That is to say, according to embodiments of the present invention, before the first main relay 141 is turned off (opened), the first sub relay 142 having the resistor R is first turned on (closed), the first main relay 141 is then turned off, and the first sub relay 142 is finally turned off, to reduce the current step by step, thereby preventing arcing and voltage spikes from occurring in the first main relay 141 and ultimately preventing fusion of the first main relay 141.

Figure 6A:
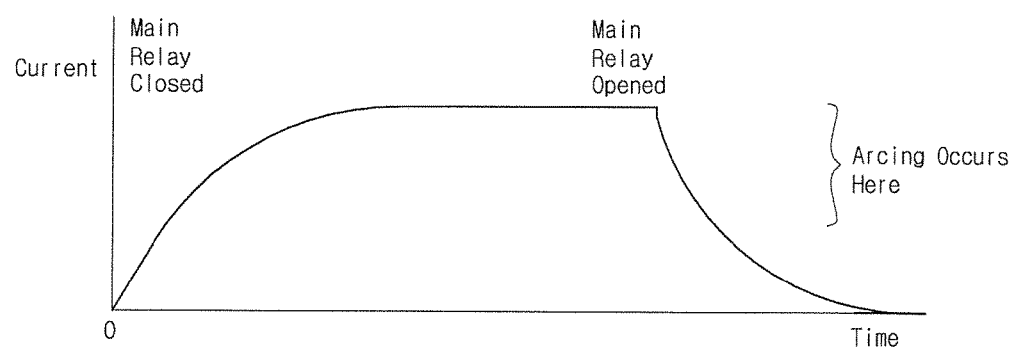
FIG. 6a is a graph illustrating the relationship between the time and current of a main relay when the main relay is turned off according to an embodiment of the present invention.
Figure 6B:
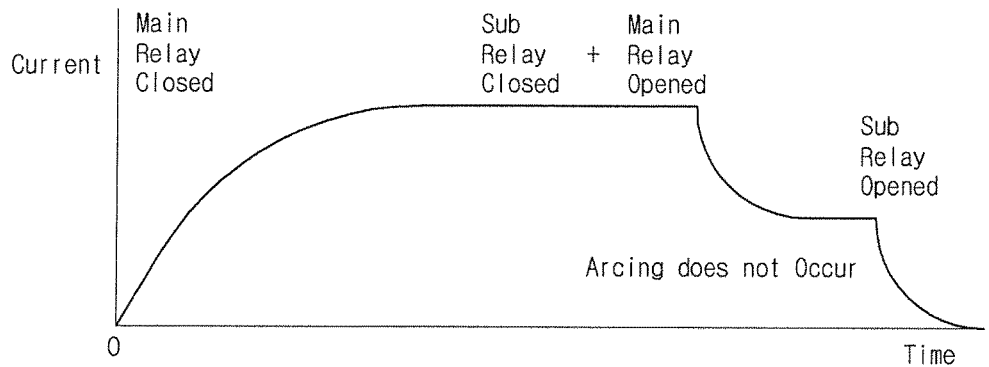
FIG. 6b is a graph illustrating the relationship between the time and current when a main relay is turned off after a sub relay is turned on according to an embodiment of the present invention.

FIG. 6a is a graph illustrating the relationship between the time and current of a main relay when the main relay is turned off, and FIG. 6b is a graph illustrating the relationship between the time and current when the main relay is turned off after a sub relay is turned on.

As illustrated in FIG. 6a, in a case where a main relay is directly turned off (opened) in a state in which there is no sub relay, the current is rapidly reduced over a set or predetermined time, thereby increasing the risk of arcing and voltage spikes occurring in the main relay. Thus, the main relays may be fused.

However, as illustrated in FIG. 6b, in a case where the main relay is turned off and the sub relay is finally turned off from a state in which the sub relay is turned on, the current is reduced step by step for a set or certain time, so that the risk of arcing and voltage spikes occurring in the main relay may be reduced, thereby lowering a probability of the main relay being fused.

Figure 7:
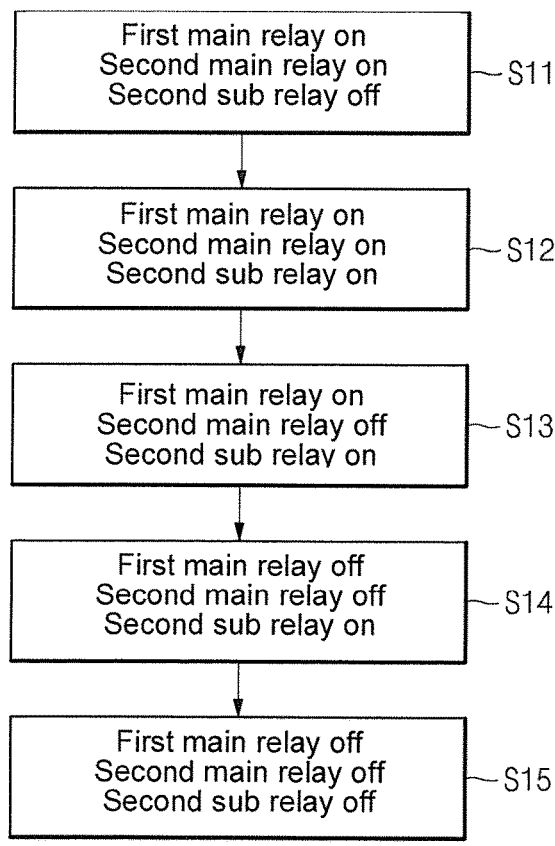
FIG. 7 is a flowchart illustrating a method for switching relays in a battery management system according to another embodiment of the present invention.

FIG. 7 is a flowchart illustrating a method for switching relays in a battery management system according to another embodiment of the present invention. That is to say, FIG. 7 illustrates a switching method of the battery management system 102 shown in FIG. 2.

As illustrated in FIG. 7, the switching method according to the present invention includes turning on first and second main relays (S11), turning on a second sub relay (S12), turning off the second main relay (S13), turning off the first main relay (S14) and turning off the second sub relay (S15).

FIGS. 8a to 8e illustrate a sequence of turning off relays in a battery management system according to an embodiment of the present invention. The switching method of the battery management system 102 according to the present invention is described herein with reference to FIGS. 8a to 8e together with FIG. 7.

Figure 8A:
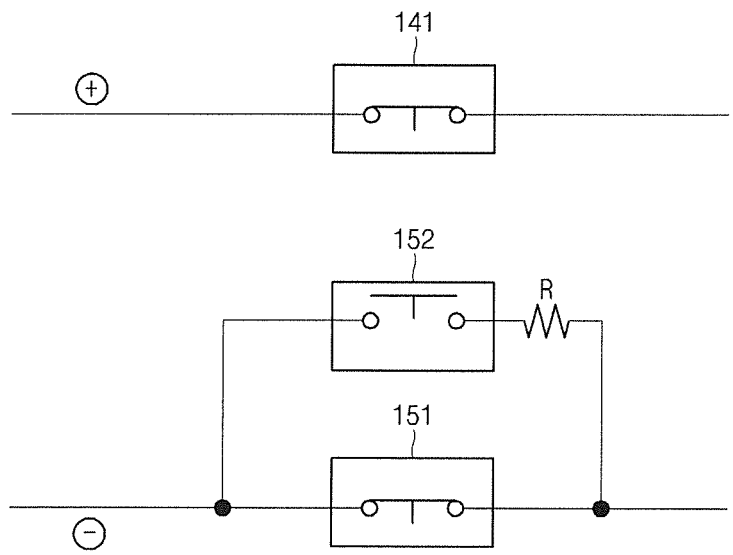
FIGS. 8a to 8e illustrate sequential states in a method for switching relays in a battery management system according to an embodiment of the present invention.

In step S11, as illustrated in FIG. 8a, the first main relay 141 and the second main relay 151 are turned on, thereby electrically connecting the battery packs 110 and the load (e.g., the inverter 180). Here, the second sub relay 152 is maintained in a turned-off state.

Figure 8B:
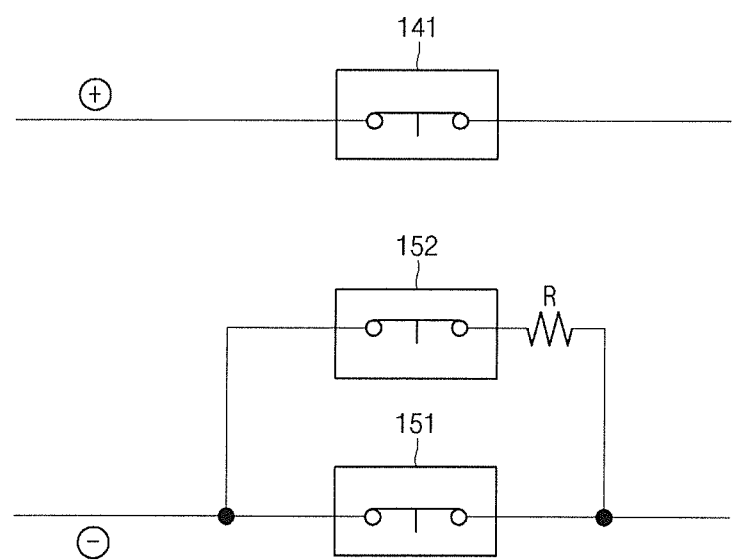

In step S12, as illustrated in FIG. 8b, the second sub relay 152 is turned on, thereby reducing the current flowing through the second main relay 151. That is to say, before the second sub relay 152 is turned on, the current flows through only the second main relay 151. However, as the second sub relay 152 is turned on, the current flowing through the second main relay 151 is reduced.

Figure 8C:
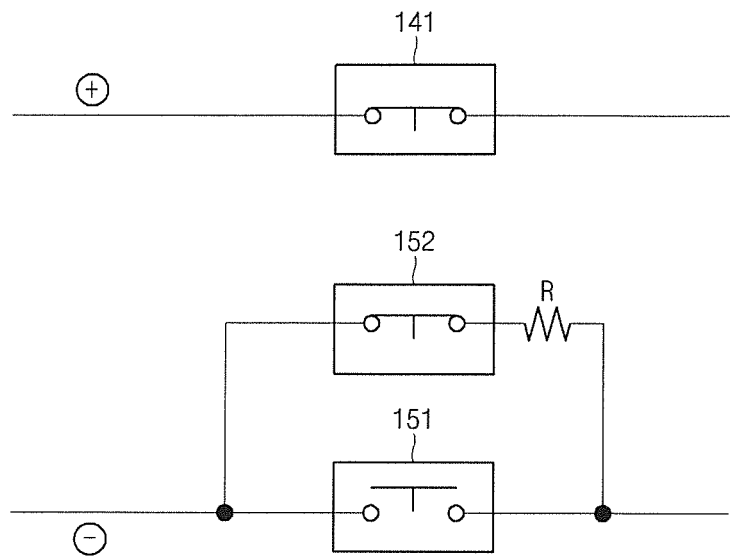

In step S13, as illustrated in FIG. 8c, the second main relay 151, connected in parallel with the first sub relay 142, is turned off. Here, since the second sub relay 152 is turned on, even if the second main relay 151 is turned off, the current between the battery packs 110 and the load (e.g., the inverter 180) is not sharply reduced. That is to say, even if the second main relay 151 is turned off, current still flows through the second sub relay 152.

Figure 8D:
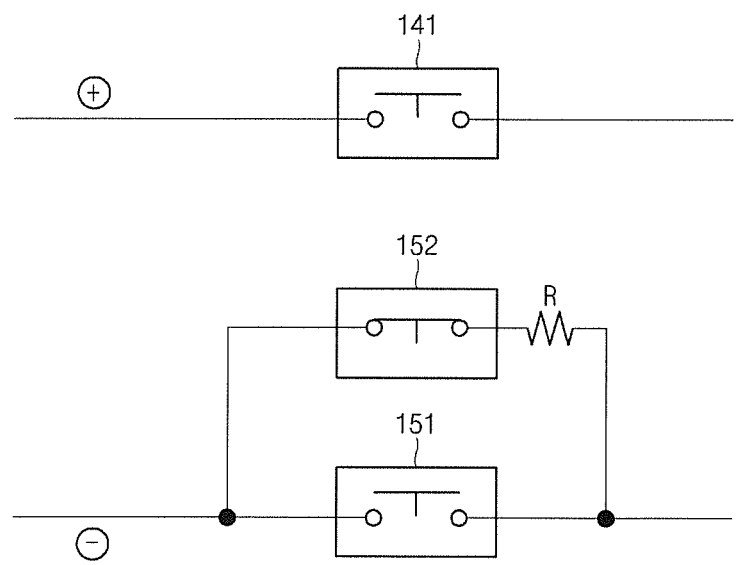

In step S14, as illustrated in FIG. 8d, the first main relay 141 is turned off, thereby blocking an electrical path between the positive electrode of the battery packs 110 and the load (e.g., the inverter 180).

Figure 8E:
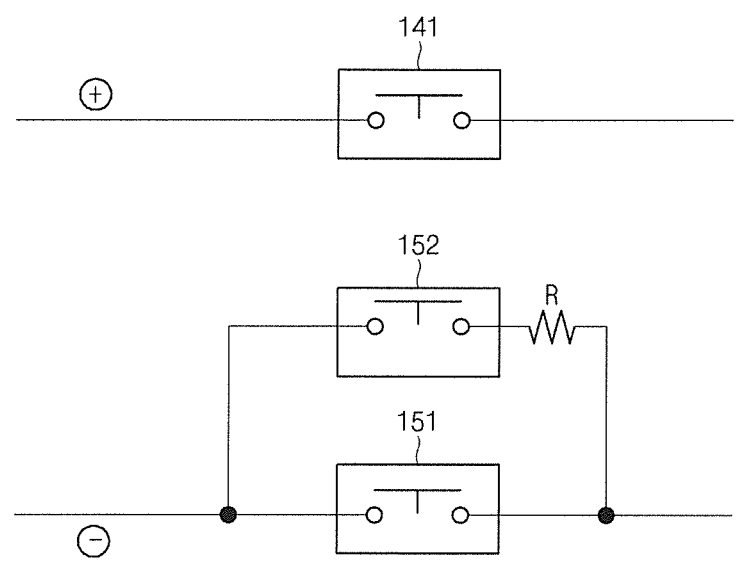

In step S15, as illustrated in FIG. 8e, the second sub relay 152 is turned off, thereby blocking an electrical path between the negative electrode of the battery packs 110 and the load (e.g., the inverter 180). In such a manner, the electrical path between the battery packs 110 and the load (i.e., the inverter 180) is completely blocked.

Therefore, in the battery management system 102 and the switching method thereof according to the present invention, when the second main relay 151, which is connected to the negative electrode of the battery packs 110 and the load is turned off (opened), the current is slowly reduced, thereby preventing arcing and voltage spikes from occurring and ultimately efficiently preventing fusion of the second main relay 151. That is to say, according to the present invention, before the second main relay 151 is turned off (opened), the second sub relay 152, having the resistor R, is first turned on (closed), the second main relay 151 is then turned off, and the second sub relay 152 is finally turned off, to reduce the current step by step, thereby preventing arcing and voltage spikes from occurring in the second main relay 151 and ultimately preventing fusion of the second main relay 151.

Although the illustrated embodiments have been described with regard to the cases where the first sub relay having the resistor is connected to the first main relay in parallel and where the second sub relay having the resistor is connected to the second main relay in parallel, respectively, the cases may also be simultaneously implemented by the present invention using a single circuit.

That is to say, the present invention can implement a circuit in which the second sub relay having the resistor is connected in parallel with the second main relay while the first sub relay having the resistor is connected in parallel with the first main relay. In this case, after the first sub relay is turned on, the first main relay may be turned off, and after the second sub relay is turned on, the second main relay may be turned off. In addition, after the second sub relay is turned on, the second main relay may be turned off, or after the first sub relay is turned on, the first main relay may be turned off. In addition, after the operations stated above, the first and second sub relays are turned off, thereby preventing arcing and voltage spikes from occurring in the first and second sub relays, and preventing the first and second sub relays from being fused.

While the battery management system and the switching method thereof according to the invention has been described in connection with certain exemplary embodiments, it will be understood by those skilled in the art that the invention is not limited to the disclosed embodiment, but rather is intended to cover various modifications included within the spirit and scope of the appended claims and equivalents thereof.

EXPLANATION OF REFERENCE NUMERALS

101,102: Battery management system according to the present invention
110: Battery packs
111: Battery cells
120: Slave battery management units
130: Master battery management unit
131: Current sensor
141: First main relay
142: First sub relay
151: Second main relay
152: Second sub relay
161: Safety switch
162: Safety fuse
170: Controller
180: Inverter
190: Motor generator

What is claimed is:

1. A battery management system comprising:
   a first main relay electrically and physically connected between a first electrode of a battery pack and a load;
   a first sub relay element comprising a first sub relay, the first sub relay element electrically and physically connected between the first electrode of the battery pack and the load in parallel with the first main relay; and
   a first controller and a second controller, different from the first controller, the first and second controllers configured to control the first main relay and the first sub relay independent of each other, the first and second controllers being configured such that one of the first and second controllers:
   switches the first main relay to an on state while the first sub relay is in an off state when the battery pack is to be electrically connected to the load, and
   switches the first main relay to an off state only while the first sub relay is in an on state when the battery pack is to be electrically disconnected from the load.

2. The system of claim 1, wherein the first sub relay element further comprises a resistor connected between the battery pack and the load in series with the first sub relay.

3. The system of claim 1, wherein each of the first controller and the second controller is configured to turn on the first sub relay before turning off the first main relay.

4. The system of claim 1, wherein each of the first controller and the second controller is configured to turn off the first sub relay after turning off the first main relay.

5. The system of claim 1, further comprising a second main relay,
   wherein the second main relay is connected between a second electrode of the battery pack and the load.

6. The system of claim 5, wherein each of the first controller and the second controller is further configured to control the second main relay, and each of the first controller and the second controller is configured with the first main relay, the first sub relay element, and the second main relay, to turn the second main relay off only when the first sub relay is turned on and the first main relay is turned off.

7. The system of claim 5, further comprising a second sub relay element comprising a second sub relay, the second sub relay element connected between the second electrode of the battery pack and the load in parallel with the second main relay.

8. The system of claim 7, wherein the second sub relay element further comprises a resistor connected between the battery pack and the load in series with the second sub relay.

9. The system of claim 8, wherein each of the first controller and the second controller is further configured to control the second main relay and the second sub relay, and
wherein each of the first controller and the second controller is configured with the second main relay and the second sub relay element to turn the second main relay off only when the second sub relay is turned on.

10. The system of claim 1 wherein the load comprises an inverter.

11. The system of claim 10, wherein the load comprises a motor generator coupled to the inverter.

12. The system of claim 10, wherein the first controller is an inverter controller configured to control the inverter, and the second controller is an air bag controller.

13. The system of claim 1, wherein the first electrode is a positive electrode, and the first main relay is connected between the positive electrode and the load and the first sub relay is connected between the positive electrode and the load.

14. The system of claim 1, wherein the first electrode is a negative electrode, and the first main relay is connected between the negative electrode and the load and the first sub relay is connected between the negative electrode and the load.

15. The system of claim 13, further comprising a second main relay connected between a negative electrode and the load,
wherein a second electrode of the battery pack is the negative electrode.

16. The system of claim 14, further comprising a second main relay connected between a positive electrode and the load,
wherein the first electrode of the battery pack is the positive electrode.

17. A method for switching, in a battery management system, the method comprising:
switching a first main relay connected between a battery pack and a load to an on state while a first sub relay in a first sub relay element is in an off state, the first sub relay element connected between the battery pack and the load in parallel with the first main relay;
switching the first sub relay to an on state after the switching the first main relay to the on state and while the first main relay is in the on state; and
switching the first main relay to an off state while the first sub relay is in the on state;
switching a second main relay connected between the battery pack and the load to an on state; and
switching the second main relay to an off state after the switching the first main relay to the off state and while the first sub relay is in an on state.

18. A method for switching, in a battery management system, the method comprising:
switching a first main relay connected between a battery pack and a load to an on state while a first sub relay in a first sub relay element is in an off state, the first sub relay element connected between the battery pack and the load in parallel with the first main relay;
switching the first sub relay to an on state after the switching the first main relay to the on state and while the first main relay is in the on state;
switching the first main relay to an off state before switching the first sub relay to an off state;
switching a second main relay connected between the battery pack and the load to an on state;
switching a second sub relay in a second sub relay element to an on state, the second sub relay element connected between the battery pack and the load in parallel with the second main relay; and
switching the second main relay to an off state before switching the second sub relay to an off state and while the second sub relay is in an on state.

19. The method of claim 17, wherein the load comprises an inverter, and
wherein the switching the first main relay to the off state while the first sub relay is in the on state comprises switching the first main relay to the off state in accordance with a signal from an inverter controller configured to control the inverter or from an air bag controller configured to control an air bag before switching the first sub relay to an off state in accordance with a signal from the inverter controller or from the air bag controller.

* * * * *